United States Patent [19]
Hinson et al.

[11] Patent Number: 4,617,380
[45] Date of Patent: Oct. 14, 1986

[54] PROCESS FOR THE PREPARATION OF CONCENTRATED STABLE LIQUID DYE SOLUTIONS OF CI DIRECT YELLOW 11 UTILIZING AN EXTENDED SURFACE SILICA FILTER AID DURING A DESALTING PROCEDURE

[75] Inventors: James W. Hinson, Jackson; Jo A. Cleverdon, Mobile, both of Ala.

[73] Assignee: Ciba-Geigy Corporation, Ardsley, N.Y.

[21] Appl. No.: 649,343

[22] Filed: Sep. 11, 1984

[51] Int. Cl.$^4$ ............... C09B 27/00; C09B 46/00; D06P 1/90
[52] U.S. Cl. ........................... 534/576; 8/602; 8/604; 8/664; 8/682; 534/571; 534/689; 534/728; 534/887
[58] Field of Search ............... 534/689, 576, 887, 728, 534/571; 8/604, 602, 664, 682

[56] References Cited
U.S. PATENT DOCUMENTS

| | | | |
|---|---|---|---|
| 3,122,529 | 2/1964 | Huey et al. | 534/689 X |
| 3,679,353 | 7/1972 | Streck | 534/689 X |
| 4,118,182 | 10/1978 | Smith | 534/689 X |

Primary Examiner—Floyd D. Higel
Attorney, Agent, or Firm—Karl F. Jorda

[57] ABSTRACT

A process is disclosed for the preparation of concentrated stable liquid dye solutions of CI Direct Yellow 11 starting with the tetrasodium complex of the stilbeneazo(xy) based-catalyzed condensation of 4-nitrotoluene-2-sulfonic acid, the wet-cake or the dried technical grade of the condensed tetrasodium complex. The process comprises the steps of forming an aqueous suspension of the starting materials which are admixed with the extended surface silica filter aid and the resulting slurry is acidified with a strong inorganic acid to pH below about 2.5; the slurry is heated to promote the metathetical reaction forming the free acid complex of the yellow chromophore and sodium sulfate or sodium chloride; the salt remains in water-soluble form while the insoluble free acid complex is absorbed on the filter aid; the resulting acidified slurry is filtered through a filter, pre-coated with an aqueous slurry of the filter aid; the resulting filter-cake, containing the free acid complex, is washed with water until all the salt is removed; the washed filter cake is reslurried with an alkanolamine/water mixture; the alkanolamine is present in an amount sufficient to provide an aqueous phase in the pH range 6.5 to 7.5; the free acid complex is converted to the liquid alkanolamine stilbeneazo(xy) complex of the Direct Yellow 11 which is desorbed from the filter aid; the neutralized slurry is filtered; the filtrate contains the alkanolamine-complexed Direct Yellow chromophore, which is concentrated by removing the contained water until the stable liquid Paper Yellow 11 complex dyestuff results.

8 Claims, No Drawings

PROCESS FOR THE PREPARATION OF CONCENTRATED STABLE LIQUID DYE SOLUTIONS OF CI DIRECT YELLOW 11 UTILIZING AN EXTENDED SURFACE SILICA FILTER AID DURING A DESALTING PROCEDURE

BACKGROUND OF THE INVENTION

This invention relates to a process for preparing concentrated stable liquid dye solutions of CI Direct Yellow 11 (Paper Yellow 11). Paper Yellow 11 is an intense yellow stilbeneazo(xy) dye that is very substantive to cellulose. The structure assigned to this dyestuff is

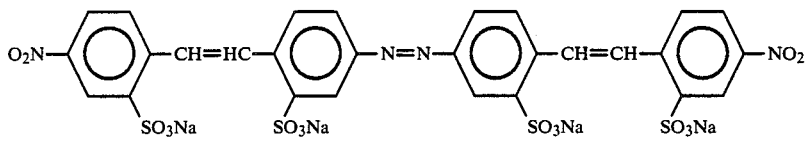

It is produced by a well known and well publicized process. The industrial process was described in BIOS Report 1548 after World War II. It is based on the self-condensation of 5-nitro-ortho-toluene sulfonic acid in the presence of a concentrated alkali metal hydroxide solution. The products obtained are the alkali metal complexes of the stilbeneazo(xy) dye.

The 5-nitro-ortho-toluene sulfonic acid is neutralized by the base, usually sodium hydroxide and the solution is heated to 50°–90° C. for several hours to promote the condensation. The excess base is neutralized with sulfuric or hydrochloric acid. The dye is filtered from the reaction mass. It is marketed as the wet cake or the cake is dried.

This neutralized dye is a sodium salt complex of the chromophore and is only sparingly soluble in water (1–5%). With other stilbene dyes the poorly soluble salts are converted to more soluble salt to achieve improved solubility. This would be accomplished by precipitating the chromophore in its free acid form by the addition of acid. This free acid form is then converted to a more soluble salt by dissolving it in an appropriate base. However, this standard method for improving solubility to form dye solutions is inappropriate for Paper Yellow 11 (Direct Yellow 11) as its free acid form has extremely poor filtration characteristics. The salts formed during the acid neutralization with sulfuric or hydrochloric acid (sodium sulfate or sodium chloride) form a viscous slime. This slime could not be filtered using conventional equipment. Because of this filtration problem, the salts could not be removed from the resultant wet cake. Removal of the salt is necessary for the formation of liquid Paper Yellow 11 concentrates.

Concentrates of Paper 11 are desirable for pulp dyeing in paper manufacture, but such concentrates have not been readily available.

There have been several methods proposed heretofore for obtaining the desired Paper Yellow 11 concentrates. They have primarily been based on redesign of the condensation reaction to directly provide the dye as a concentrated aqueous solution. These methods have had several shortcomings due either to instability of the final product during industrial storage and economical or ecological drawbacks.

U.S. Pat. No. 3,905,949, issued in 1975 to E. I. duPont (DRP No. 1,644,308) describes a method of condensation in which the alkali metal base is lithium hydroxide. The final product is a highly concentrated, water-soluble dye paste. This soluble lithium salt complex is more substantive than the sodium salt complex. The disadvantage of this lithium-based paste product is that it does not form sufficiently stable dye solutions. On storage, the concentrated solutions within a short time, at elevated temperatures, formed gels and tended to crystallize or flocculate at slightly below room temperature (5°–15° C.). Such problems with "pot life" seriously interfere with industrial use of this invention.

It has also been proposed, in German Offenlegungsschrift No. 2,820,487, that the base-catalyzed 4-nitrotoluene-2-sulfonic acid be carried out in the presence of the reaction products of ammonia and ethylene oxide, sodium or lithium hydroxide. In German Offenlegungsschrift No. 3,046,450 this condensation takes place in the presence of a primary, secondary or tertiary amine and lithium hydroxide. It has been noted that at least some of the sulfo groups on the chromophore prepared in this manner are in the form of alkali metal salts.

German Offenlegungsschrift No. 3,110,261 describes the condensation in the presence of sodium hydroxide and alkanolamines in an aqueous/alcoholic medium. The organic solvent system including glycol-ethers as well as conventional alcohols provide stable dye solutions but has been ecologically faulted for the relatively large amounts of the glycol-ethers discharged in the waste waters after paper dyeing.

Another drawback has been the reduced solubility and poor stability of concentrated dye solutions because of the salt content of the finished dye solutions. Since the condensations are carried out in strongly basic media, the neutralization of these bases produces enough salts to adversely affect the stability and solubility of the dye. Desalting steps have been proposed.

In German Offenlegungsschrift No. 2,451,219, sodium ions are precipitated (after acidification) by means of the relatively expansive hexafluorosilicic and replaced by cations which improve solubility. This method requires and additional filtration step to remove the precipitated sodium hexafluorosilicate.

European Patent Application No. 53,220 offers a method for preparing low-electrolyte dyes, by first converting the dye to lipophilic amine salt which is separated from the highly electrolytic salt-containing reaction mass. The separated lipophilic amine salt is then reacted with diethanolamine to form the diethanolammonium salt. The lipophilic amine is recovered and recycled.

It is an object of this invention to provide a process for converting the product of the standard sodium hydroxide catalyzed condensation of 5-nitro-ortho-toluene sulfonic acid to liquid, water-soluble concentrates of Paper Yellow 11 (C.I. Direct Yellow 11) that are stable for storage as concentrates and in dyeing solution dilution.

THE INVENTION

As mentioned above, when the insoluble tetrasodium complex of the Direct Yellow 11 (CI), Paper Yellow 11, is acidified, the free acid complex of the yellow chromophore remains insoluble but the metathetically formed inorganic salt of the neutralizing acid with the replaced sodium is not very soluble, in fact, it forms a slimy, ropey floc or deformable, hydrated-gel which clogs the filters. It is thus very difficult to remove sufficient amounts of the inorganic salts from the dye to permit formation of stable concentrates. It is recognized by the industry that the salts destabilize the solutions and liquid concentrates of Paper Yellow 11.

The present invention is based on the discovery that when an extended surface filter aid is present when this tetrasodium yellow chromophore complex is converted to the free acid complex, the latter is absorbed on the filter aid, while the salt, in the presence of the silica is prevented from forming gels and crystallizes into a readily soluble form.

The present invention thus provides a process for the preparation of a liquid dyestuff of CI Direct Yellow 11 in stable form from the tetrasodium complex of the stilbeneazo(xy) based-catalyzed condensation of 4-nitrotoluene-2-sulfonic acid.

The starting material for the process may be the condensation reaction mass, the wet-cake or the dried technical grade of the condensed tetrasodium complex. The process comprises the steps of forming an aqueous suspension of the aforementioned starting materials which are admixed with the filter aid and the resulting slurry is acidified with a strong inorganic acid such as sulfuric or hydrochloric acid. The slurry is acidified to pH below about 2.5; preferably in the range 2.5 to 1.5; and optimally at about 2.0.

The slurry is heated to promote the metathetical reaction forming the free acid complex of the yellow chromophore and sodium sulfate or sodium chloride (depending on the acid). The salt remains in water-soluble form while the insoluble free acid complex is absorbed on the filter aid. The resulting acidified slurry is then filtered through a filter, pre-coated with an aqueous slurry of the filter aid.

The resulting filter-cake, containing the free acid complex, is then washed with water until all the salt is removed. The washed filter cake is then reslurried with an alkanolamine/water mixture. The alkanolamine is present in an amount sufficient to provide an aqueous phase in the pH range 6.5 to 7.5. Under these conditions the free acid complex is converted to the liquid alkanolamine stilbeneazo(xy) complex of the Direct Yellow 11 which is desorbed from the filter aid. The neutralized slurry is then filtered. The filtrate contains the alkanolamine-complexed Direct Yellow chromophore. This complex, in solution, is concentrated by removing the contained water until the stable liquid Paper Yellow 11 complex dyestuff results. It is standardized to the desired tinctorial strength by optical density measurements.

DETAILED DESCRIPTION

As mentioned, the preferred starting materials are derived from the tetrasodium complex of Direct Yellow 11. However any complex that yields the free acid complex on acidification may be desalted and stabilized by this process including the lithium Paper Yellow 11 complex according to the aforementioned U.S. Pat. No. 3,905,949 (duPont).

The preferred strong inorganic acid for preparing the free acid complex is sulfuric acid. At elevated temperatures only stoichiometric amounts are needed to complete the metathetical reaction. Hydrochloric acid requires an excess to complete the reaction and the resulting NaCl does not vary sufficiently in solubility with temperature to permit speedy washing from the filter. Nitric acid has been found to shift the dyestuff color slightly to longer wave lengths introducing orange shades to the dyed paper.

The alkanolamines are particularly excellent solubizers for the alkanolamine complexes. The dyestuffs they provide disperse easily in the dyeing solutions and are self-leveling, penetrating easily into massed or felted fibers. The useful alkanolamines have the formula

where at least one of R', R" or R''' are $HO(CH_2)_n$, the rest being H or $CH_3(CH_2)_m$, where n is an integer from 1 to 6 and m is 0 to 6.

Preferred are triethanolamine (TEA) and diethanolamine (DEA). Economically useful is the commercially available unrefined mixture containing 85% TEA and 15% DEA.

After acidification the slurry is heated to about reflux temperature (97° C.) for about 30 minutes to ensure completion of the reaction. The neutralization reaction proceeds rapidly even at room temperature being hindered only by the viscosity of the alkanolamine. To promote this reaction, the neutralization mixture is maintained at about 65° C. to ensure lowered viscosity of the mixture during conversion to the alkanolamine stilbeneazo(xy) complex and its filtration.

The final complex, after removal of the excess water, is adjusted to an absorbence of 24 at λmax 417 nm.

The product is very liquid, disperses easily in the dyeing water and is stable after storage at 25° C. for nine months. It is also stable after 20 days at about 5° C.

It is useful to add to the complexed triethanolamine, diethanolamine and mixtures thereof up to 30% of urea. The urea promotes leveling of the dyes on the cellulose fibers, improving the quality of the final papers.

In addition Dicalite filter aid, other filter aid products that can be employed are any diatomaceous earths, such as Celite (made by Johns-Manville), Celatom (made by Eagle-Picher), Kenite (made by Witco Chemical), etc.

The process will be described more fully in the examples. It is to be understood that the procedures are illustrative of the preferred mode but are merely exemplary. Changes in scale, art-recognized equivalent substitutes for the starting materials and/or reactants are intended as long as they fall within the ambit of the current status of the art and within the ambit of the disclosure.

EXAMPLE 1

Heat 500 g water in a reactor to 65° C. and add 50 grams of dried Paper Yellow 11, technical powder, 5 gms of Dicalite Superaid (diatomaceous silica sold by Grefco, Inc.) and 38 gm of $H_2SO_4$. Heat to reflux and agitate for about ½ hour. Filter this slurry through a 15 cm Buchner filter pre-coated with an aqueous suspension containing 5 gm of Decalite Superaid filter aid. The filter is washed with water until free from $Na_2SO_4$. The cake is then extracted with a 15% aqueous solution of TEA and the extracts filtered. The filtrate is concentrated by removal of water under a mild vacuum. The concentrate was standardized to an absorbence 24 at λmax 417 nm.

EXAMPLE 2

The procedure of Example 1 was followed with the exception that the filter cake was extracted with a 100% TEA aqueous solution containing about 3 wt.% of lithium hydroxide (LiOH.2 $H_2O$).

EXAMPLE 3

The procedure of Example 1 was followed by using the commercial 85% TEA/15% DEA mixture instead of the TEA. The product was fully equivalent to that of Example 1.

EXAMPLE 4

Ten grams of bleached cellulose was suspended in 500 ml water (pH=abt 7). The mixture was agitated to permit the fibers to swell and hydrate. After about 30 minutes, 2.5 fms of the product of Examle 1, diluted in 200 ml water was added to the synthetic "furnish". Agitation was continued for 30 minutes. The furnish was introduced into a laboratory Fourdrinier papermaking machine formed into paper sheets. The resulting paper was uniformly dyed to an intense yellow color with a reflectance value of 38 at λmax 440 nm.

What is claimed is:

1. A process for the preparation of a liquid dyestuff of CI Direct Yellow 11 (Paper Yellow 11) in stable form, from the tetrasodium complex of this stilbeneazo(xy) base-catalyzed condensation of 4-nitrotoluene-2-sulfonic acid using as the starting material, the reaction mass, the wet cake or the dried technical grade of the condensed tetrasodium complex which comprises the steps of forming an aqueous suspension of said starting material; admixing to said suspension an extended surface filter aid; acidifying said suspension with a strong inorganic acid to a pH in the range of from about 2.5 to about 1.5; to form the free acid complex of said Direct Yellow 11; filtering said suspension through a filter, pre-coated with said extended surface filter aid, wherein said filtrate is the aqueous component of said suspension and said filter cake comprises the absorbed free acid form of the stilbeneazo(xy) dye complex; washing said filter cake with water until free from the sodium salt of said inorganic acid; slurrying the washed filter cake with an alkanolamine/water mixture in an amount sufficient to provide an aqueous phase in the pH range 6.5 to 7.5 to convert said free acid complex in said slurry to the soluble liquid alkanolamine stilbeneazo(xy) complex; filtering the slurry and collecting the filtrate; concentrating the filtrate by removal of sufficient water to provide a stable liquid dyestuff of proper tinctorial strength.

2. The process according to claim 1 wherein the extended surface filter aid is selected from the group consisting of diatomaceous earths and synthetic extended surface silicas.

3. The process according to claim 1 wherein said inorganic strong acid is either sulfuric or hydrochloric acid.

4. The process according to claim 3 wherein said acid is sulfuric acid.

5. The process according to claim 1 wherein said alkanolamine has the formula

where at least one of R', R" and R''' are independently $HO(CH_2)_n$; and the rest are $CH_3(CH_2)_m$ or H; n is an integer from 1 to 6 and m is an integer from 0 to 6.

6. The process according to claim 5 wherein the alkanolamine is triethanolamine.

7. The process according to claim 5 wherein the alkanolamine is diethanolamine.

8. The process according to claim 5 wherein the alkanolamine is a mixture of 85% triethanolamine and 15% diethanolamine.

* * * * *